United States Patent Office 3,335,602
Patented Aug. 15, 1967

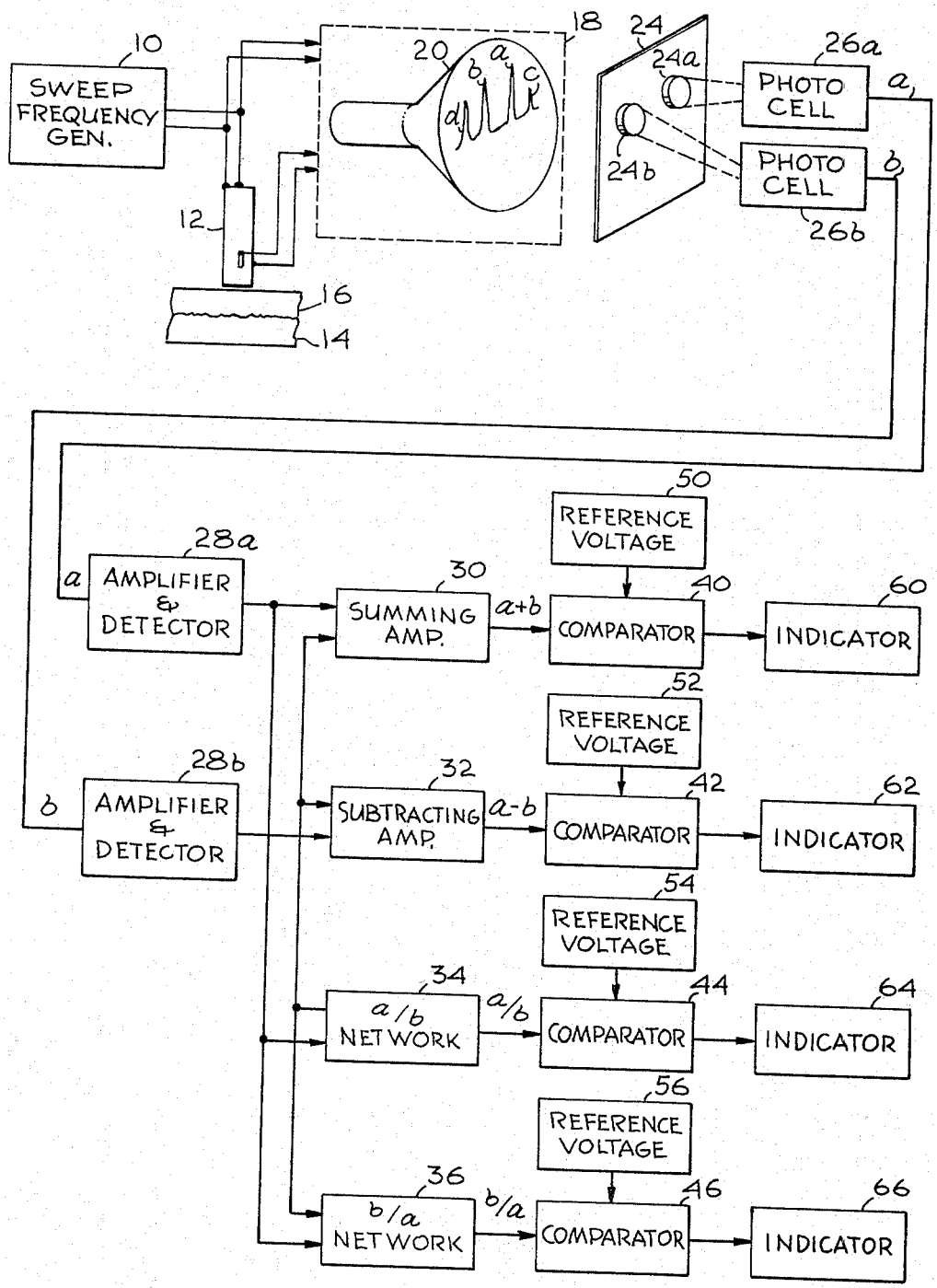

3,335,602
APPARATUS FOR IDENTIFYING BOND DEFECTS
John G. Martner, Atherton, Calif., assignor to Stanford Research Institute, Menlo Park, Calif., a corporation of California
Filed May 13, 1964, Ser. No. 366,952
7 Claims. (Cl. 73—67.1)

This invention relates to apparatus for nondestructibly testing structural bonds and more particularly to improvements therein.

In Patent No. 2,851,876 for "Ultrasonic Apparatus for the Nondestructive Evaluation of Structural Bonds," and in Patent No. 3,016,735 for "Structural Bond Evaluation," there is described driving circuitry as well as a transducer which is employed for the purpose of determining how good a bond has been made between, for example, metal and plastic, which has been joined with an adhesive. Obviously, by obtaining a structural bond evaluation apparatus which can produce valid results without destroying the part under test, makes the apparatus quite valuable. Further, if the testing apparatus can indicate not only that a defective bond exists, but the nature of the defective bond, its value is still further enhanced. While this too has been described in the previously-mentioned patents, the present invention provides a means for evaluating a structural bond, which affords an improved and automatic evaluation and analysis of the quality of a structural bond.

Accordingly, an object of the present invention is the provision of an improved means for evaluating the structural bond on adhesive bonded samples.

Another object of the present invention is the provision of a unique means for testing a structural bond, indicating its quality, and if defective, the type of defect which exists.

Yet another object of the present invention is the provision of a novel and useful structural bond evaluation means.

These and other objects of the present invention may be achieved by applying an electromechanical transducer to a surface of the structure wherein a bond is desired to be tested. The transducer is vibrated over a range of frequencies by apparatus such as a sweep frequency oscillator of the type used in panoramic analysis. Output is derived from the transducer, which is applied to cathode ray tube apparatus for producing a visual display on the face of the cathode ray tube. The display comprises a waveform having four peaks which are usually located at four possible natural resonant frequencies of the transducer, and displayed by the cathode ray tube.

Photoelectric apparatus is employed for detecting two of the peaks and producing output signals whose amplitudes represent the amplitudes of two of the four peaks displayed. These two signals are then applied to circuitry which performs the analog addition of the two signals, analog subtraction, division of one signal by the other, and a reciprocal of the division. The amplitudes of these separate signals produced by these four separate circuits are indicative of four separate properties of the bond. By comparing these four separate signals with four separate reference standard signals obtained from tests of structural materials with known defects, deviations from these reference standard signals may be used to actuate apparatus which indicates the nature of the defect which is present. Since the transducer may be a cylinder on the order of three-fourths of an inch to an inch in diameter, there is not only provided an indication of a defect, but also the location of said defect.

The novel features that are considered characteristic of this invention are set forth with particularity in the appended claims. The invention itself both as to its organization and method of operation, as well as additional objects and advantages thereof, will best be understood from the following description when read in connection with the accompanying drawing, which is a block schematic diagram of an embodiment of the invention.

As previously described, the transducer which is employed with this invention is made of a ferroelectric material, such as barium titanate. In an embodiment of the invention, which was built and used successfully, the transducer was a cylinder of barium titanate ¾″ diameter and substantially 1″ thick. This was axially poled and when driven by a sweep frequency generator, indicated consecutively four natural resonances. These resonances were displayed on the face of an oscilloscope tube where they appeared as visual peaks.

When a transducer is mechanically coupled to a body, then the transducer-body system vibrates with characteristic frequency and amplitude which are different from that of a transducer alone. These differences depend upon the characteristics of the body under test. Several resonances are exhibited and may be measured, and either the frequency contour or the resonance amplitude contour formed by a set of four resonance peaks, is characteristic of the type of defect, or properties, of the sandwich bonded body. Thus, the defects, if any, in the structure of the sandwich bonded body may be identified. By first deliberately forming defective bonds, measuring them with apparatus of the type to be described, calibration settings in the instrument may be established which may be compared with data derived from measurements on bodies having good bonds. Such comparison, as will be shown herein, provides criteria for enabling the automatic detection of the quality or type of defect of a bond.

Referring now to the drawing, a sweep frequency generator 10 drives a transducer 12 over a frequency range which will include at least four natural resonance frequencies of the transducer 12. By way of example, a frequency range which was employed with the embodiment of the invention, ranged from approximately 200 kc. to 550 kc. The transducer is applied, in well-known manner, to the surface of a body 14 or specimen having a bond 16 therein which it is desired to test. The transducer, as described in the previously-mentioned patents, not only has input electrodes to enable it to be driven by the sweep frequency generator, but also has electrodes for deriving an electrical output therefrom. These output electrodes are connected to cathode ray apparatus 18, including a cathode ray tube 20.

The face of the cathode ray tube displays a waveform having a characteristic peak envelope or contour, and more specifically, there will be displayed four resonance peaks which are usually located within the frequency region of the four natural resonance frequencies of the transducer before it is applied to the surface of the body 14. In accordance with this invention, the amplitudes of two of the four peaks which are displayed are algebraically combined. The results of such combinations may be used to determine test parameters that are unique for each type of defect. While any two of the four peaks may be used, it is preferred to use the two center peaks which are displayed. By way of illustration, a waveform 22 is drawn on the screen of the cathode ray tube 20 and it has four peaks $a$, $b$, $c$, $d$. The center two peaks $b$, $c$, are the ones which may be employed in accordance with this invention.

A set 24 of two optical lens systems 24a, 24b, located to optically face the cathode ray tube screen, is used to separate the desired two of the four peaks displayed on the tube face. The lens systems 24a, 24b are located in a manner so that they will permit light to be seen from the cathode ray tube which emanates only from the region thereof which displays the two center peaks. The light which comes through lens 24a is detected by a photocell 26a. The light which comes from lens 24b is detected by a photocell 26b. In order to maintain the synchronism of the cathode ray tube display with the output signal received from the transducer 12, a sweep frequency for the cathode ray apparatus is derived from the output of the sweep frequency generator 10.

The inverse ratio of the two peaks (b/a) identifies a contaminated bond line. The high value here identifies this condition.

Table I, shown below, illustrates typical values obtained by testing good specimens and bad specimens. The thick bond line and thin bond line specimens are shown in lines 1 and 2 to indicate that the variance in thickness of the bond lines, if the bond is a good one, does not create any problems of detection.

TABLE I.—COMBINATION OF PEAK HEIGHTS TO INDICATE TYPES OF DEFECTS

| Kind of Defect | Average<br>Peak a+Peak b<br>(Average) | Subtraction<br>Peak a−Peak b<br>(Average) | Division | |
|---|---|---|---|---|
| | | | Peak a+Peak b<br>(Average) | Peak b+Peak a<br>(Average) |
| Thick bond line (0.03 in.) | *25.5 | 6.5 | 1.50 | 0.77 |
| Thin bond line (0.01 in.) | *23.8 | 8.0 | 1.50 | 0.62 |
| Improperly mixed adhesive | 14.2 | *0.82 | 2.18 | 0.88 |
| Void | 12.0 | 14.0 | *16.0 | 0.97 |
| Grease in line | 6.2 | 2.8 | 0.42 | *3.24 |

*Discriminatory value.

The output signals from the respective photocells 26a, 26b comprise alternating current signals having an amplitude determined by the amplitude of the peak which appears in the respective images 24a, 24b. The reason the signals are alternating current type signals is because the cathode ray beam is being repetitively driven by the sweep frequency generator. The higher the peak, the more light transmitted through the respective lens systems, and therefore the greater the amplitude of the signal detected by the photocells. The two photocell outputs are respectively applied to two amplifier and detector circuits, respectively 28a, 28b, whose outputs are respectively DC signals, whose amplitudes are representative of the amplitude of the alternating current inputs. These output signals are respectively applied to a summing amplifier 30 to be added, to a subtracting amplifier 32 to be subtracted, to a dividing network 34 to produce an output representative of one signal divided by the other ($a/b$) and to a second dividing network 36 to produce an output which is the reciprocal division of the output of network 34 ($b/a$).

If the respective photocell outputs 26a, 26b be designated by the letters $a$ and $b$, then the summing amplifier outputs may be designated as $a+$, $b+$, the subtracting amplifier output may be designated as $a-$, $b-$, and the output of network 34 is $a/b$ and the output of network 36 is $b/a$. These four outputs are respectively applied to comparator networks respectively 40, 42, 44, 46. The comparator networks compare these voltages with reference voltages which are received from the respective reference voltage sources, respectively 50, 52, 54, 56. The comparator network serves to compare its inputs and to generate an error signal in the event of differences which are deemed nonacceptable. The respective outputs of the comparators 40, 42, 44, 46, are then applied to indicators, respectively 60, 62, 64, 68. These indicators may be relay activated devices or light for indicating the presence of an error signal. These lights may be used to illuminate signs that constitute English words descriptive of the bond defect present under the transducer.

As a result of testing the number of defective bond specimens with known defects, and also by measuring a considerable number of excellent bond specimens, the values obtained by adding the two peak amplitudes provide a value indicative of the excellence of a bond which is easily identifiable. The difference of the two peak values provide a value which may be employed for identifying improperly mixed adhesives. Here, a low value indicates the degree of mixing. The ratio of the two peaks, $a$ divided by $b$, identifies voids and/or porosity within the bond line. A high peak value shows the presence of voids.

It can be seen from the foregoing table that the discrimination required of the comparators for determining the respective properties of the bond, is not exceptional. In the summation column, the values for the good thick bond and thin bond specimens stand out as maxima. In the subtraction column, the value of the specimens with improperly mixed adhesives stands out as a minimum. In the $a/b$ column, the value of the specimen with voids stands out as a maximum. In the $b/a$ column, the value of a specimen with grease stains (improper cleaning) in the bond line stands out as a maximum. Note that dividing peak $a$ by peak $b$ supplies much the same information as dividing peak $b$ by peak $a$, but the larger value is easier to utilize by the logic circuitry.

In an embodiment of the invention which was built, the sweep frequency generator employed was a Model G–6, manufactured by the Singer Metrics Division of Bridgeport, Conn. The cathode ray tube apparatus employed was a spectrum analyzer Model SPA 3/25, manufactured by the same company. The photoelectric apparatus comprised three Type 934 photocells manufactured by the Radio Corporation of America. The amplifiers and detectors employed are manufactured by the Philbrick Company, as are also the summing, subtracting and dividing circuits, which comprise equipment commonly used in analog simulation. This equipment is also purchasable from the Philbrick Company, which manufactures these as standard modules.

The comparators comprise four sets of Mercury relays (Type HQ 1002) which are energized by standard modules purchased from the Philbrick Company. Said relays are electronically set to operate only when the proper DC signal enters the energizing corresponding module. The relay switches (contained within said relays) energize one of a set of twelve lamps contained within a commercially manufactured optical display unit (manufactured by Gill & Gill, Type 80000). Said display unit contains a set of twelve transparent labels, each located in front of the corresponding lamp. The labels are English spelled words descriptive of the presence or absence of defect or excellence of bond quality, as referred to above.

There has accordingly been described and shown herein a novel means for testing the quality of an adhesive bond and indicating the type of defect which exists. While the embodiment of the invention has been described and shown using a single transducer for bond evaluation, this should not be construed as a limitation on the invention, since the principles described are equally applicable to two transducer bond evaluations; that is where a transmitting transducer is placed on one surface of the material under test and a receiving transducer is placed on the opposite surface. Therefore, the foregoing description of the embodiment of the invention should be considered as exemplary and not as the sole possible arrangement.

What is claimed is:

1. In an apparatus for testing the quality of an adhesive bond in structural material by applying electromechanical transducer means to an outside surface of said material which is opposite said bond, and wherein said transducer means is driven over a predetermined frequency range from an oscillation generator which frequency range includes two resonant frequencies of said transducer, and an output derived from said transducer means is displayed, the improvement comprising means for deriving from the output of said transducer means a first and a second signal respectively having amplitudes representative of the amplitude of a first and second resonant peak in said transducer means output, means for combining said first and second signals to roduce resultant signals and means for indicating the quality of said bond from said resultant signals.

2. In apparatus as recited in claim 1 wherein said means for combining includes a first means for adding said first and second signals, a second means for subtracting said first signal from said second signal, and a third means for dividing said first signal by said second signal.

3. Apparatus for testing a structural bond from an outside surface of the material having said bond comprising an electromechanical transducer having its operating surface in contact with said surface, a sweep frequency generator for successively and repetitively generating oscillation signals over a range which includes resonance frequencies of said transducer in contact with the surface of said material, means for applying said sweep frequency generator output to said transducer, means for deriving an output from said transducer, means for deriving a first and a second signal from said transducer output respectively representing the amplitude at two different resonant frequencies in said transducer output, means for combining said first and second signals, and means responsive to the combination of said first and second signals for indicating the quality of said bond.

4. Apparatus as recited in claim 3 wherein said means for deriving a first and a second signal from the output of said transducer comprises cathode ray tube apparatus including a cathode ray tube, means for applying the output of said sweep frequency generator and of said transducer to said cathode ray tube apparatus for displaying a waveform on said cathode ray tube having a first and a second resonant peak, means for selecting light from two predetermined regions of the waveform displayed by said cathode ray tube and a first and second photocell positioned for respectively receiving the light from said means for selecting light from two predetermined regions of the waveform displayed.

5. Apparatus as recited in claim 3 wherein said means for combining said first and second signal include adding means to which said first and second signals are applied to be added, subtracting means to which said first and second signals are applied to be subtracted from one another, first dividing means to which said first and second signals are applied for dividing said first signal by said second signal, and second dividng means to whch said first and second signals are applied for dividing said second signal by said first signal.

6. Apparatus for evaluating a bond in structural material by applying electromechanical transducer means to one surface of said structural material comprising a sweep frequency generator for generating a range of oscillations including four resonant frequencies of said transducer means while applied to said one surface of said structural material, means for applying said generator output to said transducer means, means for deriving an output from said transducer means, cathode ray tube means, means for applying output from said transducer and from said sweep frequency generator to said cathode ray tube means for displaying thereon a waveform having two resonant peaks, a first and a second photoelectric means positioned adjacent said cathode ray tube means for respectively generating in response to the display thereon a first and a second signal representative of the amplitude of said first and second resonant peaks, first combining means to which said first and second signals are applied for producing an output indicative of the quality of said bond, second combining means to which said first and second signals are applied for producing an output indicative of the condition of the adhesive employed for said bond, third combining means to which said first and second signals are applied for indicating the presence of any void and/or porous regions in said bond, and fourth combining means to which said first and second signals are applied for indicating the cleanliness of the bonded surface.

7. Apparatus as recited in claim 6 wherein said first combining means comprises apparatus for adding said first and second signals for producing the sum thereof, said second combining means comprises apparatus for subtracting said first and second signals for producing the difference thereof, said third combining means comprises apparatus for dividing said first signal by said second signal, and said fourth combining means comprises apparatus for dividing said second signal by said first signal.

References Cited

UNITED STATES PATENTS

| 2,846,874 | 8/1958 | Horn | 73—67.1 |
| 3,014,364 | 12/1961 | Crooks | 73—67.1 |

FOREIGN PATENTS

| 1,270,089 | 7/1961 | France. |

JAMES J. GILL, *Acting Primary Examiner.*

RICHARD C. QUEISSER, *Examiner.*

JOHN P. BEAUCHAMP, *Assistant Examiner.*